United States Patent [19]
Nagaishi

[11] Patent Number: 5,845,020
[45] Date of Patent: Dec. 1, 1998

[54] CHARACTER RECOGNIZING APPARATUS

[75] Inventor: Michihiro Nagaishi, Nagano-ken, Japan

[73] Assignee: ATR Auditory and Visual Perception Research Laboratories, Kyoto, Japan

[21] Appl. No.: 74,518

[22] Filed: Jun. 11, 1993

[30] Foreign Application Priority Data

Nov. 18, 1992 [JP] Japan .................................. 4-308791

[51] Int. Cl.$^6$ .................................................. G06K 9/00
[52] U.S. Cl. ............................................ 382/320; 382/190
[58] Field of Search .................................. 382/29, 1, 64, 382/190, 200, 207, 320; 235/449

[56] References Cited

U.S. PATENT DOCUMENTS

| | | | |
|---|---|---|---|
| 3,818,446 | 6/1974 | Benson | 382/29 |
| 3,874,586 | 4/1975 | Foote et al. | 382/64 |
| 4,475,238 | 10/1984 | Everhart | 382/64 |

OTHER PUBLICATIONS

Systems, Computers, Controls, vol. 3, No. 3, May 1972, Washington US pp. 1–9 T. Kubota et al 'Handwritten character recognition using transformation by field' Section "5 Pattern transformation II –Case where standard pattern field exist" *figs. 7–13*.

Pattern Recognition, vol. 5, No. 3, Sep. 1973, Elmsford, NY pp. 175–197 B. Widrow 'The "rubber–mask" technique –I. Pattern measurement and analysis' Section 2. Chromosome analysis and classification *figs 3–7*.

International Journal of Computer vision, bol. 8, No. 2, Aug. 1992, Norwell US pp. 89–111, XP306598, A.L. Tuille 'Feature extraction from faces using deformable templates' Section I. Introduction.

Int. Joint Conf. on Neural Networks, vol. 1, 8 Jul. 1991, Seattle, WA pp. 7–12, XP238261, A. L. Yuille et al 'Particles tracking by deformable templates' Section "The deformable template".

*Primary Examiner*—Yon Couso
*Attorney, Agent, or Firm*—McDermott, Will & Emery

[57] ABSTRACT

The invention relates to optical character recognition and to apparatus for representing characters in a manner analogous to the field which one would expect to be induced on the retina of the eye by a particular character. A character to be recognized is compared with the same type of representation for prototypical characters and the determination made, using an elastic model, of the amount of deformation required to change the field of induction of the scanned character into the shape of that of the prototypical character. Character recognition is achieved by determining which prototypical character requires minimum energy to deform into that of the scan character or vice versa.

4 Claims, 12 Drawing Sheets

CHARACTER RECOGNIZING APPARATUS

BACKGROUND OF THE INVENTION

1. Field of the Invention

The present invention relates to a character recognizing apparatus. More specifically, the present invention relates to a character recognizing apparatus to which hand-written characters are input, character data thereof are recognized and the result of recognition is output.

2. Description of the Background Art

Figure 2:
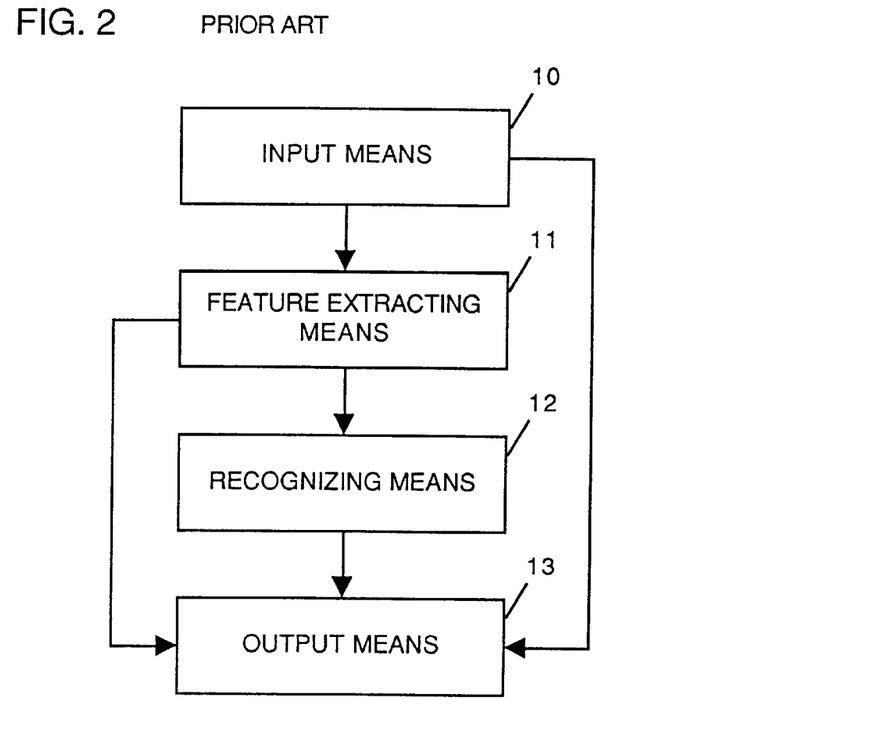
FIG. 2 shows a structure of a conventional character recognizing apparatus.

FIG. 2 is a schematic block diagram showing a conventional apparatus for character recognition. Referring to FIG. 2, characters which have been turned into electronic data are input by input means 10 such as an OCR, and features of characters are extracted by feature extracting means 11. Based on the extracted features, recognizing means 12 recognizes a character by calculating a distance between the feature which has been prepared in advance as a dictionary and the feature of the input character. States and results output from input means 10, feature extracting means 11 and recognizing means 12 are provided as outputs to output means 13.

In character recognition the features of characters used mean strokes and the like which are basic components of characters and states of distribution of coordinate points when the characters are viewed as character images represented quantitatively as multidimensional vectors. These features are heuristic because the mainly conceived based on intuition of the designer of the character recognition system, and various and many features are employed in character recognition systems. Recognition is done based on the method of multivariate analysis of the multidimensional vectors obtained in this manner.

Generally, hand-written characters, more specifically non constrained hand-written characters vary greatly in style and shape. Therefore, it is difficult to recognize hand-written characters in a high recognition rate. In order to improve recognition rate of hand-written characters, in the conventional apparatuses for character recognition, the method of recognition itself has been improved by developing a dictionary for recognition especially for characters liable to erroneous recognition, by enhancing capability of feature extraction of the character recognizing apparatus by combining a plurality of features. In addition, there have been proposals to improve the rate of recognition by using information other than the result of recognition, in which the obtained result of character recognition is verified or modified by using grammatical knowledge.

However, it is difficult to assume relevance to the actual character pattern from statitiscal analysis of multidimensional vectors. Consequently, improvement of the capability of feature extraction itself, which is in principle based on the multivariate analysis so as to cope with hand-written characters which vary widely, is very difficult. For example, it is difficult to understand intuitively how a deformation of a line of a certain character pattern is reflected at which portion of the feature. This is because the feature itself has been prepared mainly based on the intuition of the designer of the apparatus for character recognition. For this reason, measures taken so far are focused on modification of the dictionary for statistical analysis of the obtained features, and the great variation of the characters are not absorbed by the improvement in feature extraction itself.

Meanwhile, in order to attain high rate of recognition by using grammatical knowledge so that grammatically appropriate result can be obtained from the candidates resulting from character recognition, sometimes it is necessary to provide a plurality of appropriate character candidates. For example, it is preferred that the candidates include the correct character and similar characters and that the candidates do not include characters of much different shapes or characters of different categories. However, actually, candidates do include such inappropriate characters and, in such a case, a correct result cannot be obtained even when grammatical knowledge is used.

Generally, a plurality of candidates are produced simply in the order of first candidate, second candidate and the like, in accordance with the magnitude of the result (quantitative amount such as similarity to the dictionary) of the character recognition of the candidates. When an appropriate one is to be selected from the plurality of candidates by using grammatical knowledge, characters are combined in order starting from the first candidate. At this time, since all candidates are treated with the same weight, a large number of combinations must be examined to obtain one combination having proper meaning, which takes long time.

When the result of character recognition of each candidate is regarded as the reliability of the candidate to be used for weighting when grammatical knowledge is made use of, result of recognition of some characters are not preferable to be used as the reliability. This happens when the distance between patterns used as a result of character recognition is not acceptable. In practice, a plurality of candidates are selected based on the result of character recognition and a number of combinations are simply examined with all the candidates weighted equally.

SUMMARY OF THE INVENTION

Therefore, an object of the present invention is to provide an apparatus for character recognition which can present a plurality of candidates of a result of recognition which have proper content and high reliability, and in which it can be intuitionally understood how the deformation of the character pattern is reflected by what amount on the feature.

Briefly stated, in the present invention, a field of induction on the retina is calculated based on physiological and psychological knowledge, and recognition is carried out based on the magnitude of strain of the field of induction which strain is generated by deformation of the field of induction of one character image in order to match the field of induction of the other character.

Therefore, according to the present invention, a plurality of candidates of the result of recognition which have proper contents and high reliability can be presented, and it can be easily known how the deformation of the character pattern is reflected on the feature by what amount.

In a preferred embodiment, the magnitude of strain generated by the deformation of the field of induction is evaluated by an elastic energy.

What is necessary is only to calculate portions necessary for recognition by calculating the elastic energy for each potential value, and therefore the time required for calculation can be saved, and it becomes possible to detect local deformation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Prior to the description of the embodiment of the present invention, the principle of the present invention will be described.

A method of estimating the field of induction on the retina by calculation from digital images of characters which are provided as the result of electronic processing will be described as an example of estimation of the field of induction on the retina of character images based on physiological and psychological knowledge.

Figure 3:
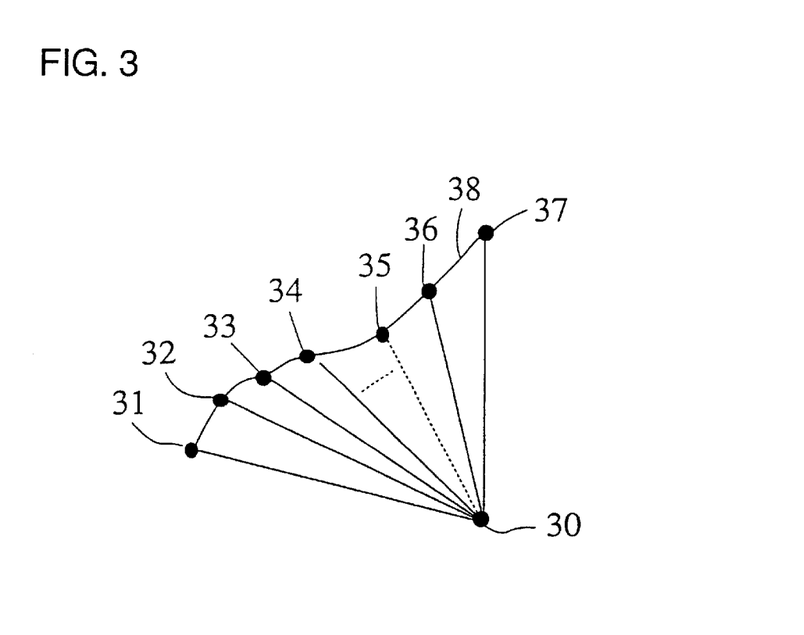
FIG. 3 shows an array of pixels of a digital image.

FIG. 3 shows an array of pixels of a digital image. The pixels of a digital image are arranged in the form of a lattice, and the distance between pixels is assumed to be 1. As shown in FIG. 3, it is assumed that the field of induction on the retina is formed at point 30 by curve 38 which is constituted by an array of n dots 31 to 37. The curve 38 corresponds to a line of a drawing or a contour of a figure. Each point constituting the curve 38 is assumed to have +1 electric charge. When the points 31 to 37 on the curves 38 are scanned from point 30 and n points constituting the curves 38 are found, strength Mp of the field of induction on the retina at point P will be defined by the following equation (1), wherein $r_i$ represents the distance to each point found during scanning: scanning:

$$M_p = \frac{1}{n} \sum_{1}^{n} \frac{1}{r_i} \qquad (1)$$

By using the equation (1), the field of induction on the retina of an arbitrary digital image can be calculated.

Figure 4:
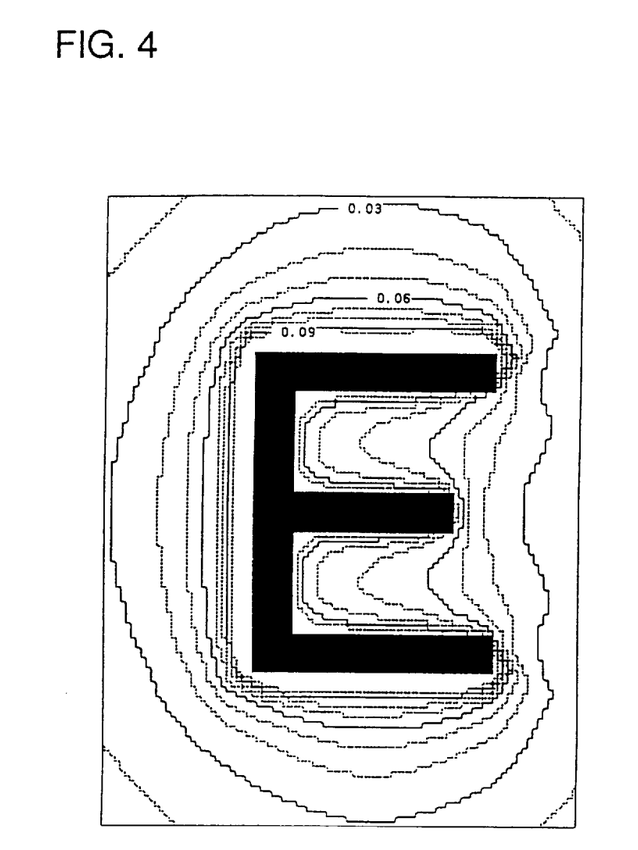
FIG. 4 shows an example of the field of induction on the retina of a character "E".
Figure 5A:
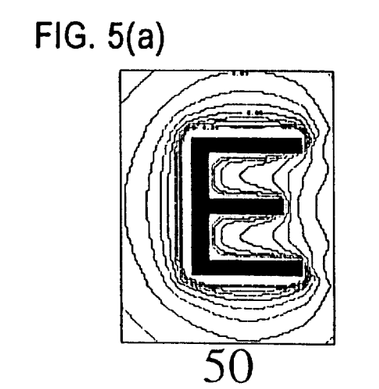
FIGS. 5(a)–5(e) shows an example of calculation of the fields of induction on the retina of various characters in the process of deformation of a part of a line of the character "E" to be changed to the character "F".
Figure 5B:
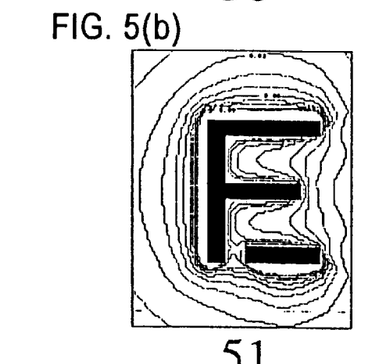
Figure 5C:
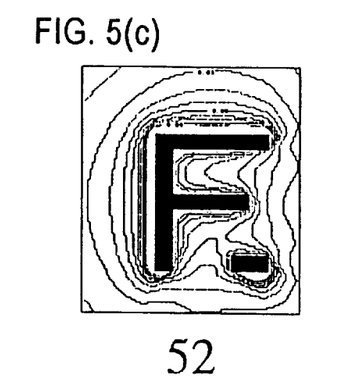
Figure 5D:
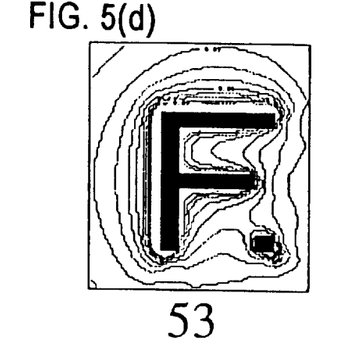
Figure 5E:
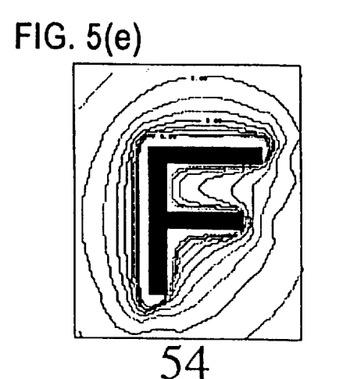

FIG. 4 shows an example of the distribution of the field of induction on the retina of a character "E" obtained in accordance with the method of calculation described above. In the following description, every field of induction on the retina will be obtained in accordance with the method of calculation described above. Referring to FIG. 4, the thick line represents the character "E" and lines existing thereabout are contour lines showing equational potential planes each connecting the same strength of the field of induction on the retina. The numerals in FIG. 4 show the strength of the field at the equational potential plane. The field of induction on the retina (hereinafter simply referred to as the field of induction) is distributed around a character and the strength therefor depends on the distance from the character.

FIG. 5 shows fields of inductions of various characters in the process of deformation of a portion of the line of character "E" to character "F". Since character "E" is different from character "F", the distribution of the fields of induction of these characters are quite different from each other. However, as the line is deformed, the distribution of the field of induction changes from the field of induction 50 of the character "E" gradually through fields 51, 52, 53 in this order to be the field of induction 54. The distribution of the field of induction becomes closer to the field of induction 54 in the order of the fields 51, 52, and 53, and the field of induction is closer to the field of induction 50 in the order of fields 53, 52, and 51. As described above, different characters have different distribution of the field of induction, and similarity of characters derived from variations of characters can also be expressed properly. Therefore, by quantizing the difference in distribution of the field of induction, characters can be discriminated from each other.

Figure 6A:
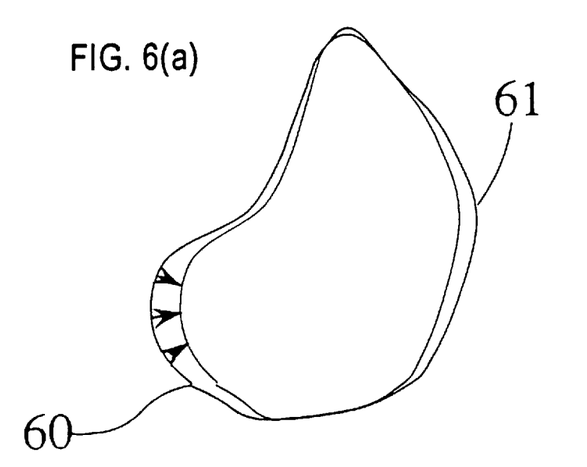
FIGS. 6(a) and (b) illustrate the principle of discrimination of characters utilizing the difference of distribution of the field of induction.
Figure 6B:
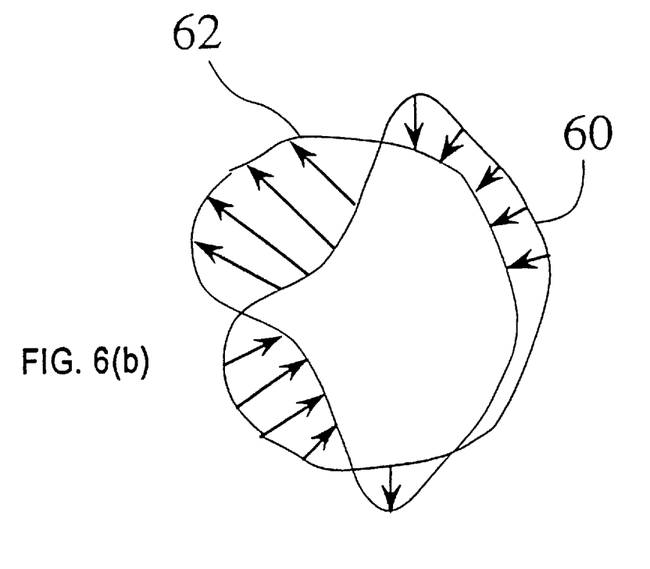

FIG. 6 illustrates the principle of character recognition utilizing the difference in distribution of the fields of induction. In considering the difference of distribution of the field of induction of the segmented character, the field of induction is considered as an elastic body such as rubber. When one field of induction is deformed by freely bending or expanding the field such as in the case of rubber in order to make the field match with another field of induction, strain is generated in the elastic body. Since the strain becomes larger as the elastic body is deformed to larger extent, the difference between both fields of induction can be quantitatively known by examining the amount of strain. In this embodiment, elastic energy is employed for determining the strain quantitatively. Assume that there are fields of induction of an unknown pattern and of two reference patterns A and B. When the unknown pattern is deformed to be matched with each of the reference patterns and the elastic energy caused by deformation for respective reference patterns are provided, it can be determined that the reference pattern for which the generated elastic energy is smaller is nearer to the unknown pattern. The contour 60 in FIG. 6 denotes the unknown character, the contour 61 shows reference pattern A and the contour 62 shows an equational potential plane at the field of induction of reference pattern B. FIG. 6(a) shows the state of deformation of an unknown character to match reference pattern A on an equational potential plane, while FIG. 6(b) shows the state of deformation of the unknown character to match reference pattern B on the equational potential plane. Since the equational potential plane of the unknown character has distribution closer to pattern A than to pattern B, the degree of deformation is smaller.

Figure 7:
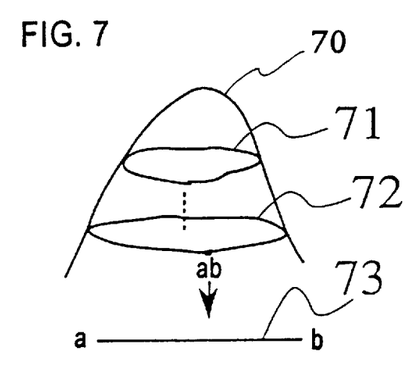
FIG. 7 shows an example of the field of induction considered as a three dimensional elastic body.

FIG. 7 is a three dimensional representation of the field of induction. Since the field of induction is a scalar field on a two-dimensional plane, it can be considered as a three dimensional elastic body 70 as shown in FIG. 7. However, since calculation of displacement is difficult when it is considered as a three dimensional body, the three dimensional field of induction is regarded as a gathering of two dimensional equational potential planes 71 and 72 as shown in FIG. 7, and strains of respective equational potential planes are calculated and added. Since only the contour should be considered on the equational potential plane, after all the calculation can be effected as a problem of one dimensional array of dots 73.

Figure 8:
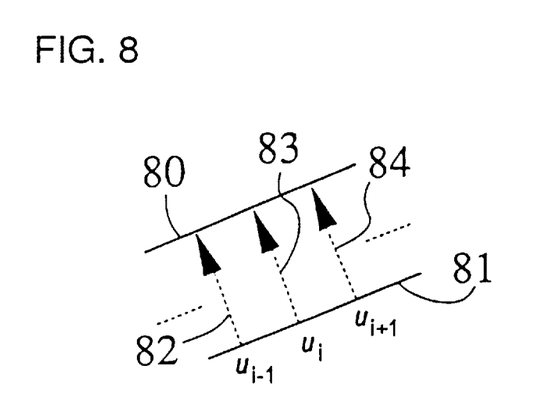
FIG. 8 shows displacement of the contour of the equational potential plane.

FIG. 8 shows displacement of a contour on an equational potential plane. Displacements 82, 83 and 84 generated when various points on border line 81 on an equational potential plane of one character pattern move to border line 80 on same equational potential plane of the other character pattern are calculated, and elastic energy caused by strains is calculated based on the displacements. This corresponds to calculation of the elastic energy caused by deformation of a membrane extended on a contour. The energy U required for the displacement of the membrane from the equilibrium state to a certain position includes an energy $U_1$ required for the deformation of the membrane and the energy $U_2$ required for the deformation of the contour, which is the edge of the membrane. Respective energies can be calculated in accordance with the following equations.

$$U_1 = \alpha \int\int (u_x^2 + u_y^2) dx dy \left( \alpha = \frac{\tau}{2} \right) \quad (2)$$

where $\tau$ represents tension uniformly applied to the membrane.

$$U_2 = \frac{\beta}{2} \int u_{ss}^2 ds \left( \beta = \frac{\tau^2}{\rho^2} C \right) \quad (3)$$

where $\rho$ represents the density of the membrane and C represents a uniform elastic coefficient.

Since $u_i = u(x(i), y(i))$, the following differential expressions can be obtained.

$$u_x = \partial u_i/\partial x = x(i) - x(i-1) \quad (4)$$

$$u_y = \partial u_i/\partial y = y(i) - y(i-1) \quad (5)$$

$$u_{xx} = \partial u_x/\partial x = x(i+1) - 2x(i) + x(i-1) \quad (6)$$

$$u_{yy} = \partial u_y/\partial y = y(i+1) - 2y(i) + y(i-1) \quad (7)$$

$$u_{ii}^2 = u_{xx}^2 + u_{yy}^2 \quad (8)$$

The displacement $u_i$ can be calculated for the entire contour, and by using the differential expressions (4) to (8) above, the elastic energy $U=U_1+U_2$ generated by the displacement can be calculated in accordance with the equations (2) and (3).

Assume that fields of induction of a plurality of categories are prepared as a dictionary. Let us represent an elastic energy generated when an unknown pattern is deformed to match a certain dictionary category i on an equational potential plane at the potential value of P as $e_i$ (P). In this embodiment, a method for recognition simply by the total elastic energy will be described. The total energy $E_i$ necessary for matching of the two patterns is represented as $$E_i = \int_0^1 e_i(p) dp \quad (9)$$

Since the value of $E_i$ becomes smaller as the category i is closer to the unknown pattern, discrimination is done by determining a category i which satisfies $$minEi \quad (10)$$

for all the categories i. The elastic energy $E_i$ (P) is a function of the potential value P. Therefore a method in which discrimination is carried out by using an evaluating function of a certain potential value P is also possible.

An embodiment of the character recognizing apparatus of the present invention will be described.

Figure 1:
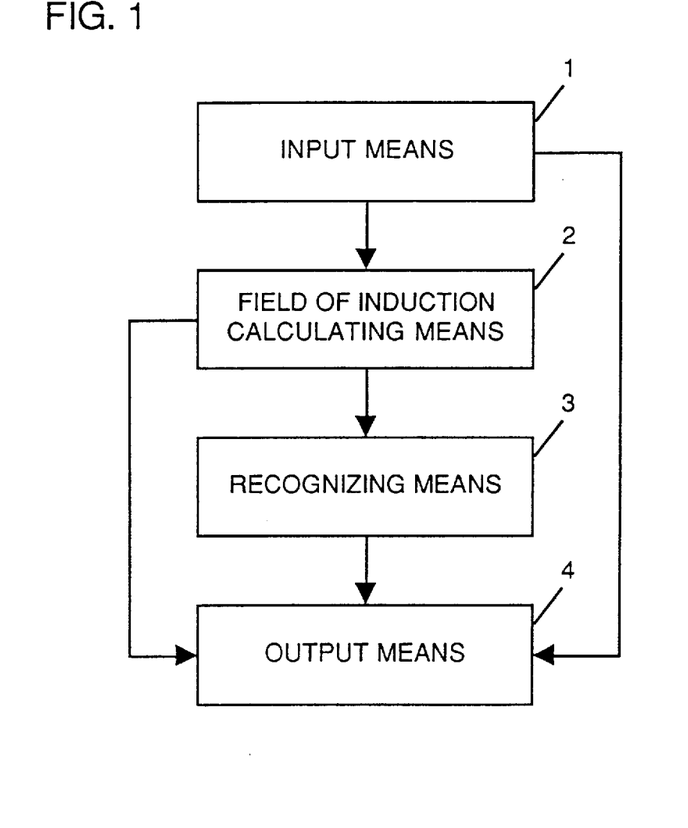
FIG. 1 shows a structure of one embodiment of the present invention.

FIG. 1 is a schematic block diagram of one embodiment of the present invention. The character recognizing apparatus of this embodiment includes input means for turning characters into electronic data and inputting character image such as an OCR; field of induction calculating means 2, for calculating the field of induction on the retina of the character image obtained by input means 1; recognizing means 3 having information necessary for character recognition and recognizing the character by evaluating, using elastic energy, the magnitude of strain generated when one field of induction on the retina is deformed to be matched with the other field of induction on the retina by using the field of induction of the retina calculated by the field of induction calculating means; and output means 4 for displaying states and results of outputs from input means 1, field of induction calculating means 2 and recognizing means 3.

Figure 9:
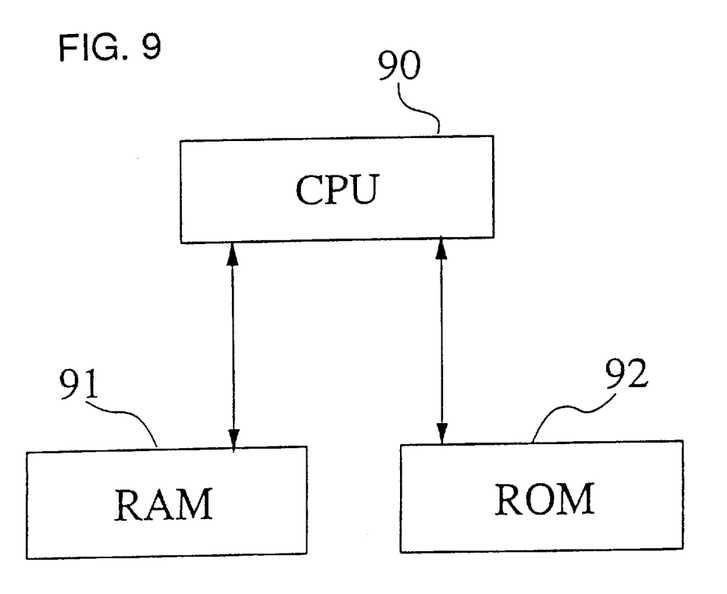
FIG. 9 shows a general electrical structure of one embodiment of the present invention.

FIG. 9 shows a general electric structure of one embodiment of the present invention. Referring to FIG. 9, a CPU 90 carries out the process of recognition by the field of induction calculating means 2 and the recognition means 3 shown in FIG. 1. Character data to be recognized, data during the process of recognition and so one are temporarily stored in a RAM 91. Data necessary for recognition are stored in a ROM 92.

Figure 10:
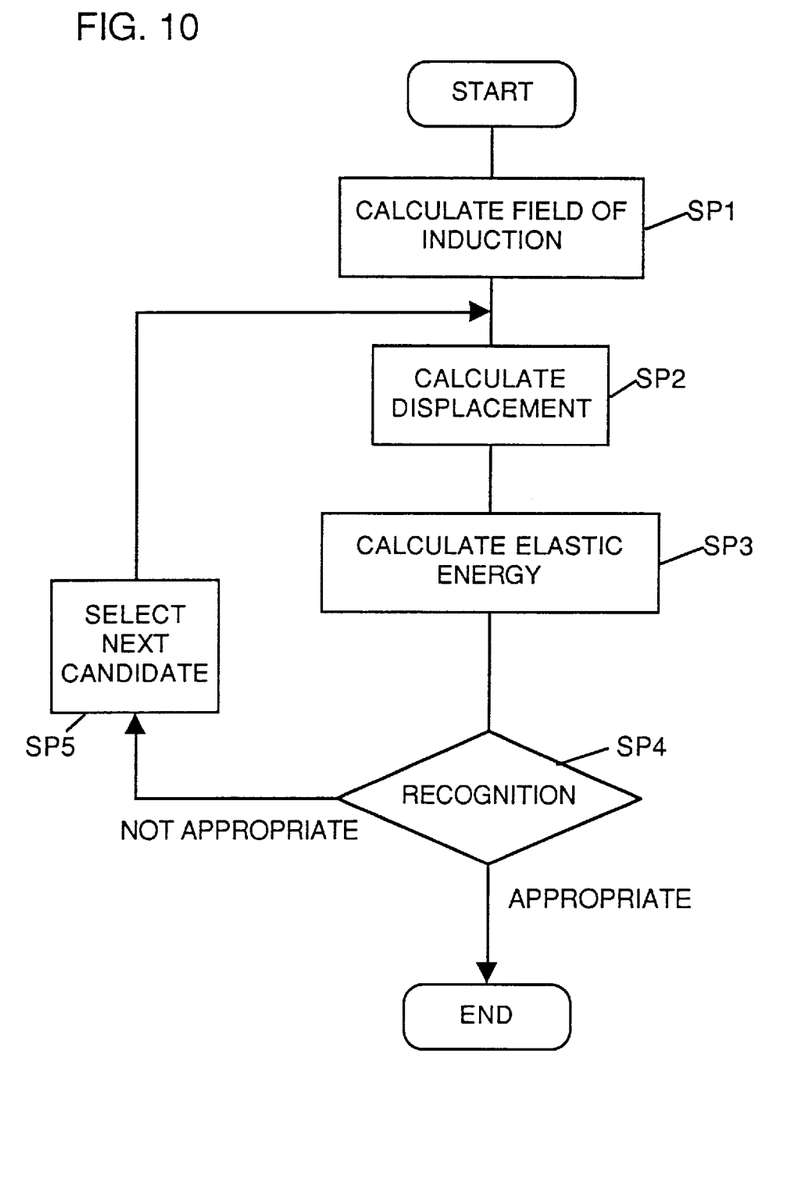
FIG. 10 is a flow chart showing the operation of one embodiment of the present invention.

FIG. 10 is a flow chart showing the operation of one embodiment of the present invention. A specific operation of one embodiment of the present invention will be described with reference to FIGS. 1, 9 and 10. When a hand-written character is input through input means 1, CPU 90 calculates the field of induction of the input character in accordance with the equation (1) in step (denoted by SP in the drawings) SP1. CPU 90 calculates displacement when the field of induction of the input character calculated in the preceding step deforms to match with the field of induction of a certain dictionary pattern which has been stored in ROM 92 in advance. Then, CPU 90 calculates the elastic energy based on the obtained displacement in accordance with the equations (2) and (3), using expressions (4) to (8) in step SP3.

In step SP4, whether or not the input character matches the dictionary pattern which is being referred to is determined based on the magnitude of the calculated elastic energy. If it is appropriate to determine that the input character is the same as the dictionary pattern, the process is terminated. If not, another dictionary pattern is selected as a candidate in step SP5, the displacement and the elastic energy are calculated again, and determination for recognition is carried out. In this manner, the difference between the fields of induction of the input character pattern and of the dictionary patterns prepared in advance are successively evaluated in terms of the elastic energy, and recognition is realized by searching for the appropriate dictionary.

Figure 11A:
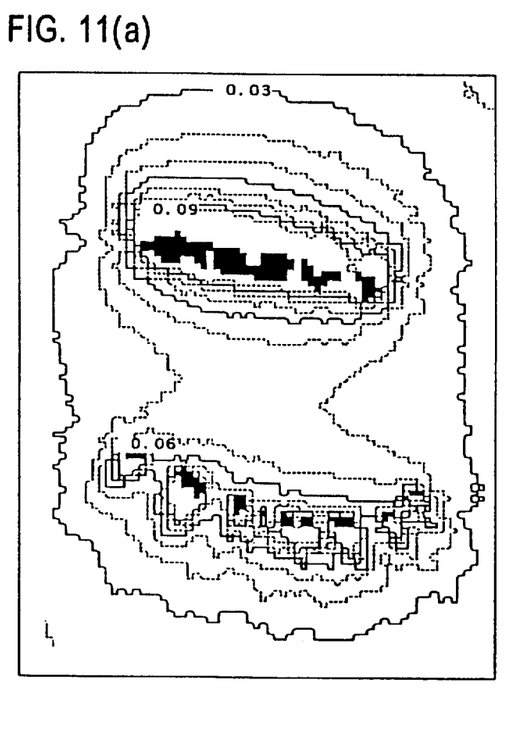
FIGS. 11(a) and 11(b) represent an example of the field of induction calculated for an actual hand-written character " ⌒ ".
Figure 11B:
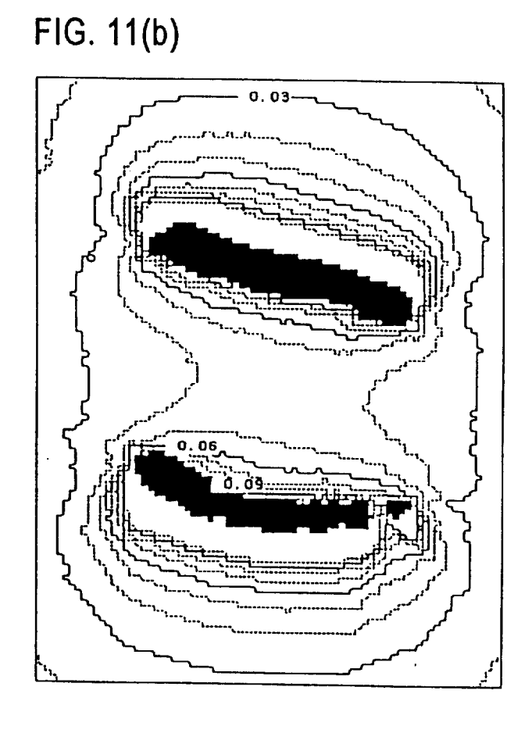

FIG. 11 shows an example of the field of induction calculated for the actual hand-written character " 2 ".

Though the character of FIG. 11(a) is blurred, the distribution of the field of induction of FIG. 11(a) is quite similar to that of FIG. 11(b) written in a general manner. Thus, even when the quality of the character is not so good, the distribution of the fields of induction are similar among the characters of the same category. Therefore, application of the field of induction to character recognition reduces the influence of the character quality to the recognition.

Figure 12A:
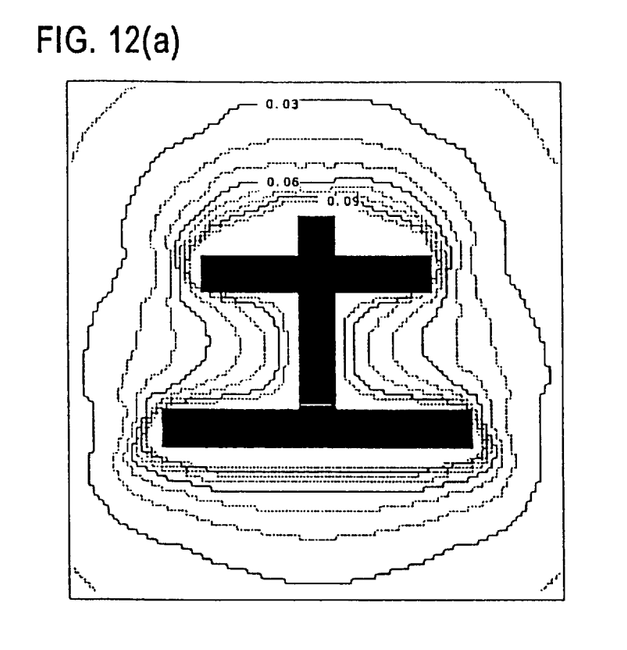
FIGS. 12(a) and 12(b) examples of the fields of induction calculated for characters " 土 " and " 士 ".
Figure 12B:
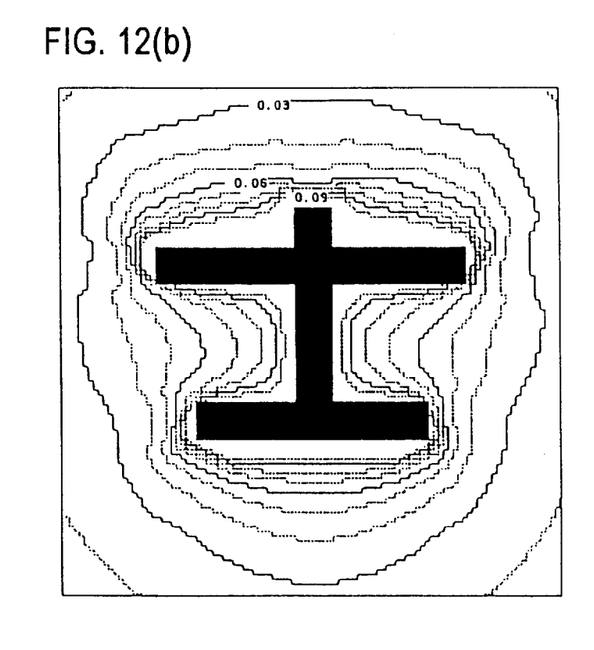

FIG. 12 shows examples of the fields of induction of the characters " 上 " and " 土 ". The characters " 上 " and " 土 " are very similar except that the length of component line are different. Generally, it is difficult to recognize these characters correctly. However, since distribution of the fields of induction of characters " 上 " and " 土 " differ from each other as can be seen from FIG. 12, the character " 上 " can be easily discriminated from " 土 " when the difference in the field of induction is used as a reference.

Figure 13:
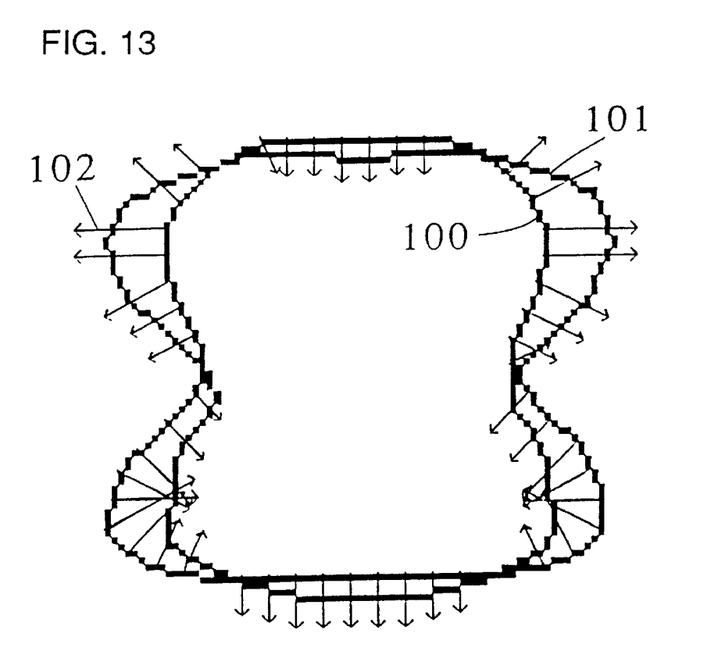
FIG. 13 shows an example of displacement of the contour line at a certain potential from " 土 " to " 士 ", when the character " 土 " is used as a reference and is deformed to match " 士 ".

FIG. 13 shows an example of displacement of a contour " 上 " to " 土 " at a certain potential value when the character " 上 " is used as a reference and it is deformed to be matched with the character " 土 ". Contour 100 represents the contour of " 上 " at a certain potential value and the contour 101 is a contour of " 土 " at the same potential value. Displacement 102 represents one of the displacements from " 上 " to " 土 ". As can be understood from this example, it can be recognized visually which portion of the character pattern is how much deformed, by the display of the displacement. Accordingly, reflection of great variations of hand-written characters or error in calculation at the time of displacement can be easily examined.

Figure 14:
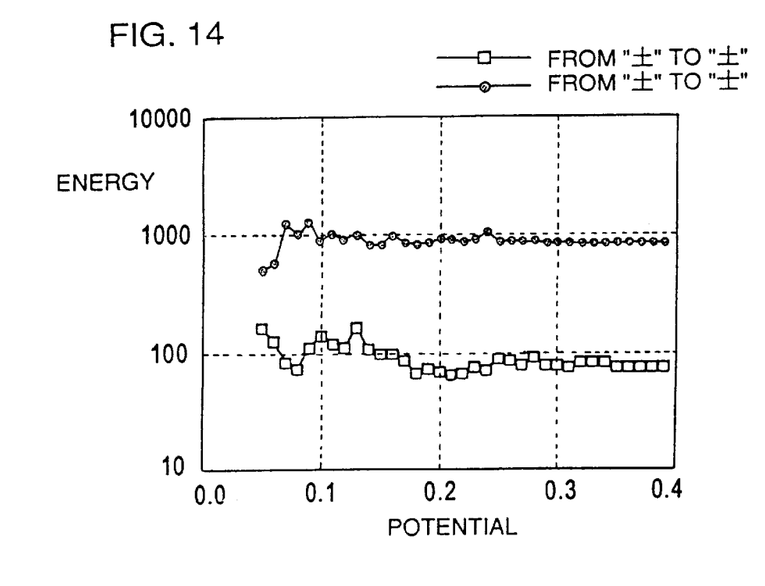
FIG. 14 shows elastic energy calculated when the character " 土 " is changed to " 士 " and when the character " 士 " is changed to " 土 ".

FIG. 14 shows elastic energies calculated when the character " 上 " is displaced to " 土 " and the character " 上 " is displaced to " 土 ". The ordinate represents the elastic energy $e_i$ (P) and the abscissa represents the potential value P. The values are calculated for the character patterns shown in FIG. 12 in accordance with the principle of displacement shown in FIG. 13. The elastic energy required for the displacement from " 上 " to " 土 " is about ten times larger than the elastic energy required for the displacement from " 上 " to " 土 ". Thus, the difference of distribution of the fields of induction between the two appears as the difference in energy.

Figure 15:
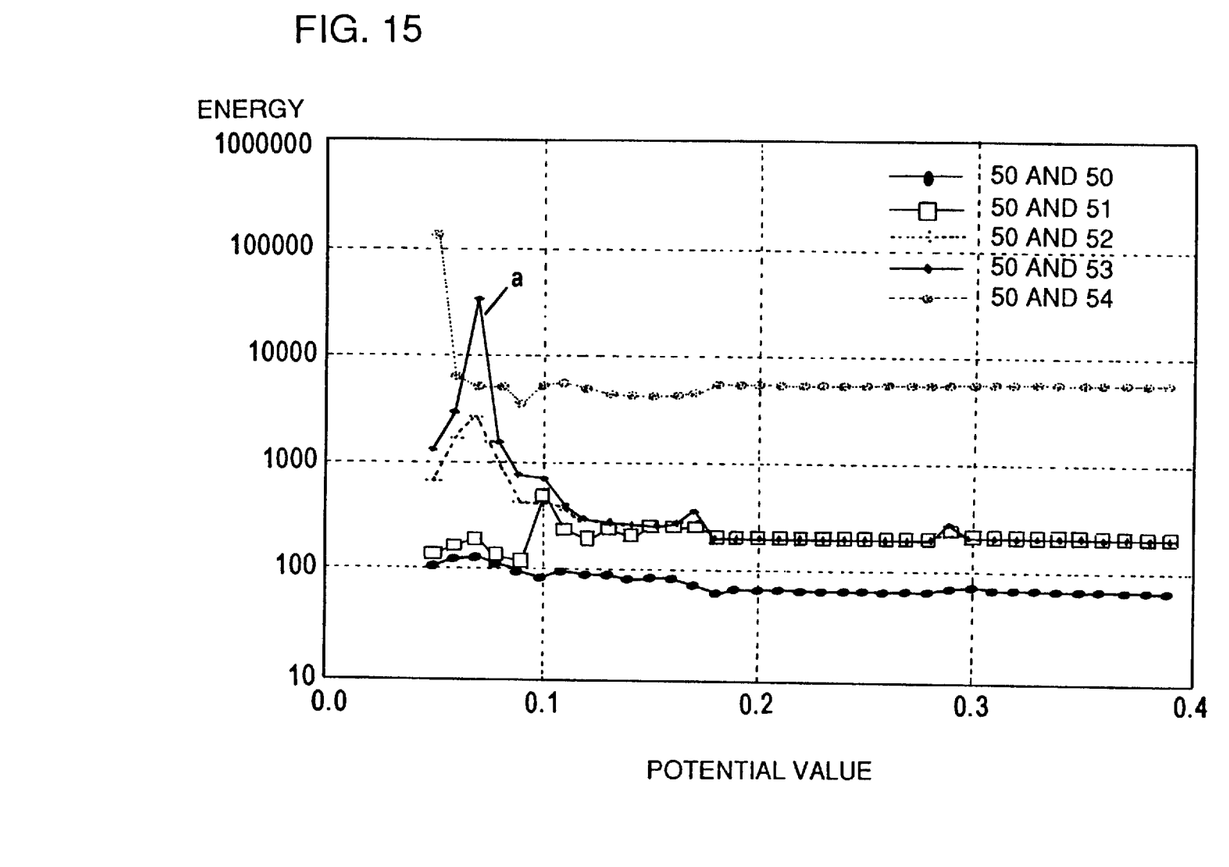
FIG. 15 shows elastic energy calculated when each pattern shown in FIG. 5 is deformed to match the field of induction.

FIG. 15 shows elastic energys calculated when respective patterns shown in FIG. 5 are deformed to match the field of induction 50. It can be understood from the magnitudes of the elastic energys that distributions of the induction fields 51, 52 and 53 are closer to the field of induction 54 in this order, and the distributions of the fields of induction of fields 53, 52 and 51 are closer to the field 50 in this order. The influence of deformation of the line appears at portions where the elastic energy at the potential value of 0.1 or smaller at fields 52 to 54 of FIG. 15 are larger than that of the field of induction 50.

The peak "a" of FIG. 15 shows the influence at the lower right portion of the field of induction 53. In the embodiment of the present invention, elastic energy for each potential value is calculated, and therefore such influence can be easily known. Further, we can assume that a large difference between the character patterns can be known mostly at portion having low potential values. Therefore, by calculating the elastic energy for various potential values only for the necessary portions, the time for calculation can be saved, and local deformation can be detected.

As can be understood from the foregoing, similarity or deformation of characters can be easily recognized by examining the distribution of the fields of induction, and partial deformation or partial similarity of characters are reflected in the magnitudes of elastic energys. The similarity of distribution of the fields of induction on the retina of the various patterns shown in FIG. 5 is quite similar to the similarity when each of the characters are recognized. This fact can be represented quantitatively as the value of elastic energy as shown in FIG. 15. Therefore, when the calculated value of the elastic energy is used as the reliability for post-processing of character recognition such as processing using grammatical knowledge, characters which are appropriate in grammatical meaning can be easily found.

As described above, according to the embodiment of the present invention, by recognizing characters by calculating the field of induction on the retina of a character image based on physiological and phychological knowledge, quantizing the magnitude of a strain generated when the field of induction of one character image is deformed to match the field of induction of another character image, a plurality of candidates of the result of recognition having proper contents and high reliability can be presented, and in addition, how the deformation of the character pattern is reflected on the feature by which amount can be easily known.

In addition, by calculating elastic energys at every potential value, the time for calculation can be saved and local deformation can be detected when only the portions necessary for recognition are calculated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A character recognizing apparatus, comprising:

input means for inputting a character image;

field of induction calculating means for calculating a field of induction on the retina of the character image input from said input means; and character recognizing means for recognizing a character based on difference between fields of induction on the retina of different character images calculated by said field of induction calculating means, by quantitatively evaluating a magnitude of a strain generated when the field of induction of one character image deforms to be matched with the field of induction of another character image.

2. The character recognizing apparatus according to claim 1, wherein said recognizing means evaluates the magnitude of the strain generated by the deformation of said field of induction in terms of elastic energy.

3. The character recognizing apparatus according to claim 2, further comprising memory means for storing in advance fields of induction of a plurality of characters which are different from each other; wherein said character recognizing means includes means for successively evaluating, in terms of the elastic energy, the difference between the field of induction of each of the characters stored in said memory means and the field of induction of said input character.

4. The character recognizing apparatus according to claim 1, further comprising output means for outputting the results of recognition by said character recognizing means.

* * * * *